United States Patent
Ibrocevic et al.

(10) Patent No.: US 9,851,269 B2
(45) Date of Patent: Dec. 26, 2017

(54) PRESSURE-SENSITIVE SAFETY DEVICE FOR MONITORING A TECHNICAL INSTALLATION

(71) Applicant: Pilz GmbH & Co. KG, Ostfildern (DE)

(72) Inventors: Onedin Ibrocevic, Ostfildern (DE); Matthias Kuczera, Ostfildern (DE); Matthias Schweiker, Ostfildern (DE)

(73) Assignee: PILZ GMBH & CO. KG, Ostfildern (DE)

( * ) Notice: Subject to any disclaimer, the term of this patent is extended or adjusted under 35 U.S.C. 154(b) by 0 days.

(21) Appl. No.: 15/335,824

(22) Filed: Oct. 27, 2016

(65) Prior Publication Data
US 2017/0146413 A1    May 25, 2017

(30) Foreign Application Priority Data
Nov. 25, 2015   (DE) .................. 10 2015 120 368

(51) Int. Cl.
*G01L 1/22*      (2006.01)
*G01L 5/00*      (2006.01)
*B25J 19/06*     (2006.01)

(52) U.S. Cl.
CPC ............ *G01L 5/0076* (2013.01); *B25J 19/06* (2013.01); *G01L 1/2287* (2013.01); *G05B 2219/40202* (2013.01); *G05B 2219/40203* (2013.01)

(58) Field of Classification Search
CPC ...... G01L 5/0076; G01L 1/2287; B25J 19/06; G05B 2219/40202; G05B 2219/40203
(Continued)

(56) References Cited

U.S. PATENT DOCUMENTS 4,555,954 A   12/1985   Kim
4,795,998 A   1/1989    Dunbar et al.
(Continued)

FOREIGN PATENT DOCUMENTS

DE   199 12 766 A1   6/2000
DE   200 14 200 U1   1/2001
(Continued)

OTHER PUBLICATIONS

DIN EN 61076-2-104; Connectors for electronic equipment—Product requirements—Part 2—104: Circular connectors—Detail specification for circular connectors with M8 screw-locking or snap-locking (IEC 48B/2305/CD:2012); Sep. 2012; 65 pp.
(Continued)

*Primary Examiner* — Max Noori
(74) *Attorney, Agent, or Firm* — Harness, Dickey & Pierce, P.L.C.

(57) ABSTRACT

A pressure-sensitive safety device for monitoring a technical installation, includes a sensor having first and second sensor cells, and first, second and third electrodes for making contact with the first and the second sensor cells. A pressure-sensitive material within the first and second sensor cells is configured, under local loading, to change an electrical property of the cells at the site of loading. An evaluation unit provides an output signal depending on an actuation of the first and second sensor cells. The first and second electrodes are connected to the first and second sensor cells, respectively, and the third electrode is connected to both the first and the second sensor cells. The first, second and third electrodes are connected to the evaluation unit by a first sequentialization element, and to a defined first potential by a second sequentialization element.

10 Claims, 9 Drawing Sheets

(58) Field of Classification Search
USPC .................................................. 73/862.632
See application file for complete search history.

(56) References Cited

U.S. PATENT DOCUMENTS

| | | | |
|---|---|---|---|
| 4,839,512 A | 6/1989 | Speck | |
| 5,606,136 A * | 2/1997 | Kropp | H03K 17/9645 73/862.045 |
| 6,522,155 B2 | 2/2003 | Pietsch et al. | |
| 7,176,816 B2 | 2/2007 | Koerner et al. | |
| 8,276,467 B2 | 10/2012 | Fritzsche et al. | |
| 9,397,681 B2 | 7/2016 | Karner | |
| 2011/0227836 A1 | 9/2011 | Li et al. | |
| 2016/0274724 A1* | 9/2016 | Chang | G06F 3/044 |
| 2017/0068376 A1* | 3/2017 | Kim | G06F 3/0416 |
| 2017/0146368 A1* | 5/2017 | Kuczera | G01D 5/16 |
| 2017/0148583 A1* | 5/2017 | Hampe | F16P 3/12 |

FOREIGN PATENT DOCUMENTS

| | | |
|---|---|---|
| DE | 10 2004 046 618 A1 | 3/2006 |
| DE | 10 2012 203 670 A1 | 9/2013 |
| EP | 2 528 234 A1 | 11/2012 |
| WO | 99/60357 | 11/1999 |

OTHER PUBLICATIONS

DIN EN ISO 13856-1; Safety of machinery—Pressure-sensitive protective devices—Part 1: General principles for the design and testing of pressure-sensitive mats and pressure-sensitive floors; Aug. 2013; 60 pp.
European Search Report for EP 16 19 5659; dated Apr. 19, 2017; 13 pp.

* cited by examiner

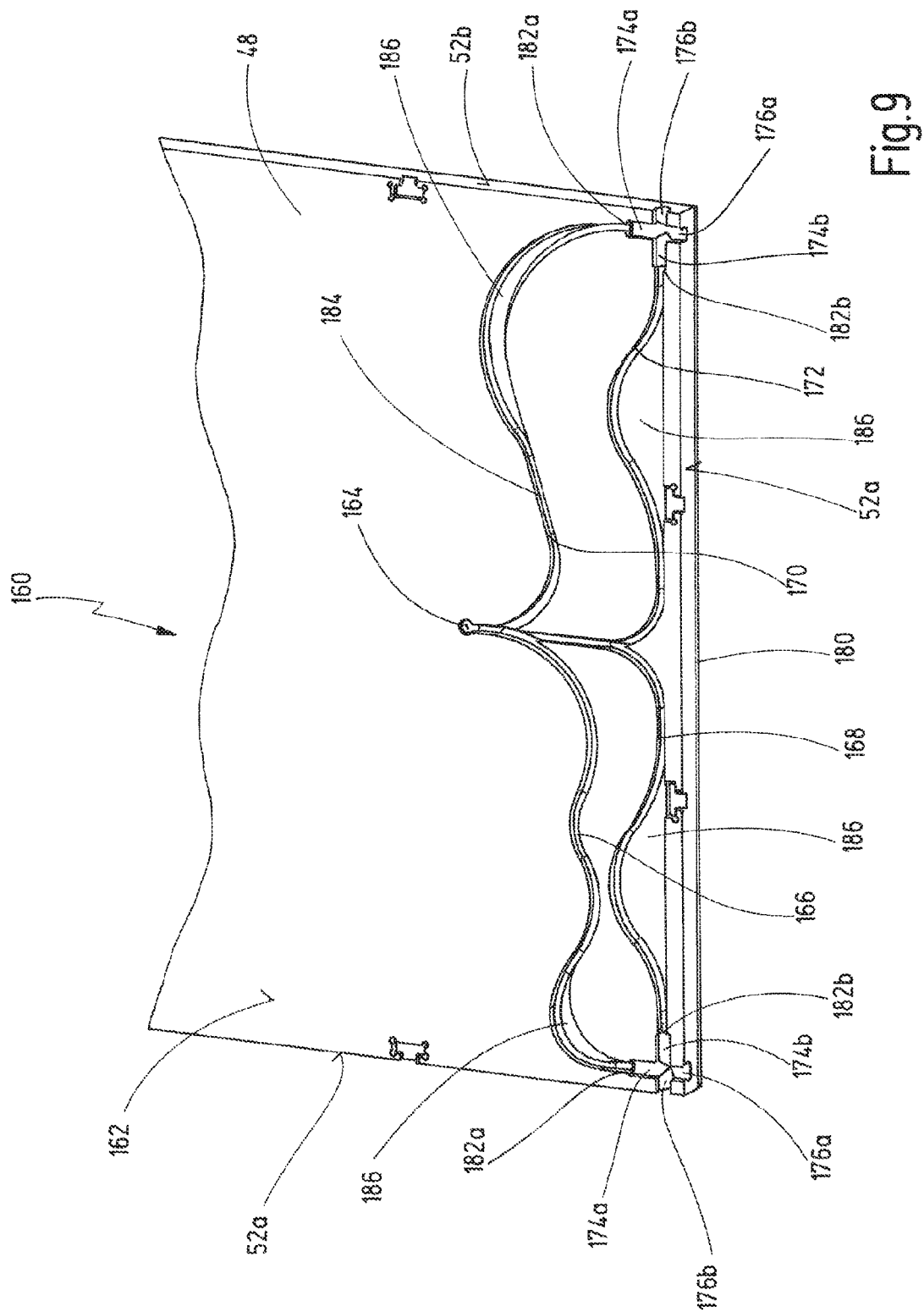

PRESSURE-SENSITIVE SAFETY DEVICE FOR MONITORING A TECHNICAL INSTALLATION

CROSS-REFERENCES TO RELATED APPLICATIONS

This application claims priority from German patent application DE 10 2015 120 368.5, filed Nov. 25, 2015. The entire content of this priority application is incorporated herein by reference.

BACKGROUND OF THE INVENTION

The present disclosure relates to a pressure-sensitive safety device for monitoring a technical installation comprising a sensor which has at least one first sensor cell and one second sensor cell and a first, a second and a third electrode for making contact with the first and the second sensor cell.

Owing to advances in signal detection and primarily electronic signal processing, the degree of automation of manufacturing processes has continuously increased over the years. Nevertheless, manual intervention is and remains an important part of a manufacturing process, and therefore development in recent years has been concentrated more on optimizing cooperation between a human and a machine. In particular, someone must not be put at risk during cooperation between human and machine. Therefore, a machine has to be able to observe its environment in its operating region and identify whether an object or a person is in the immediate vicinity. In addition to an extensive sensor system with which the machine observes its surrounding area, fault-free and reliable evaluation of these detected signals is also required in order to allow safe hand-in-hand operation between human and machine.

A sensor with which access to a machine or contact with the machine can be identified is disclosed, for example, in EP 2 528 234 B1. EP 2 528 234 B1 describes a tactile sensor of large surface area which is realized by connecting up a large number of individual sensor cells which, in the event of mechanical loading, change their electrical property in a defined manner. The sensor cells can be contacted individually by means of electrodes which are arranged in columns and rows, in order to determine a pressure distribution over the entire surface area from the changes in the individual cells. The sensor can be used as a safety shut-off mat in an access region to a machine or it can be arranged on the surface of a machine as artificial skin in order to identify collisions between a human and the machine or an object. The general principles and requirements in respect of design and testing for pressure-sensitive safety devices of this kind are defined in EN ISO 13856-1. In particular, the minimum safety requirements in respect of performance, marking and documentation are specified in the standard.

The greater the number of sensor cells to be interconnected, the greater the local resolution of the sensor, but also the greater the complexity of signal evaluation. Usually, a relatively large number of sensor cells are not evaluated at the same time and in parallel, but rather sequentially, that is to say the individual sensor cells are tested by an evaluation unit continuously one after another. However, this requires at least one further element for sequentialization in the signal processing chain, as a result of which the complexity of signal processing in the sensor and, necessarily, the number of potential sources of error increase.

DE 10 2012 203 670 A1 discloses a circuit arrangement which allows independent monitoring of a sequentialization element. The circuit arrangement is integrated in the sequentialization element and carries out a comprehensive self-test of the sequentialization element. The self-test can be performed continuously at intervals or can be initiated by a superordinate control unit as required. The result of the test is passed to a superordinate control unit or displayed to the user. The solution allows comprehensive protection against faults within the sequentialization element or the addressing of said sequentialization element, but requires sequentialization elements which are of highly complex construction and are therefore also expensive.

SUMMARY OF THE INVENTION

It is an object of the present disclosure to specify a sensor for monitoring a technical installation which is of simpler design. It is a further object to provide a sensor for monitoring a technical installation which can be produced more cost-effective. Yet it is a further objective to provide a sensor which allows sufficient verification of all the parts of the signal processing performed by the sensor.

In accordance with one aspect of the present disclosure there is provided a pressure-sensitive safety device for monitoring a technical installation, comprising a sensor which has at least one first sensor cell and one second sensor cell, a first, a second and a third electrode for making contact with the first and the second sensor cell, a pressure-sensitive material within the first and the second sensor cell, which is configured, under local loading, to change an electrical property of the first and the second sensor cell at the site of loading, and an evaluation unit which is configured to provide an output signal depending on the actuation of the first and the second sensor cell, wherein the first electrode is connected to the first sensor cell, the second electrode is connected to the second sensor cell, and the third electrode is connected to both the first and the second sensor cell, wherein the safety device further comprises a first and a second sequentialization element and a terminal for supplying a defined first potential, wherein the first, the second and the third electrode are connected to the evaluation unit by the first sequentialization element, and the first, the second and the third electrode are connected to the defined first potential by the second sequentialization element.

It is therefore an idea to over-occupy the sequentialization elements in order to allow self-testing of the sequentialization elements by the evaluation unit, in addition to the actual measurement process. In other words, in the case of a matrix-like arrangement of the electrodes of the sensor, not only the electrodes of the columns and of the rows are respectively combined by a sequentialization element, but each sequentialization element is connected to all of the electrodes of the columns and rows.

A sequentialization element alternately connects its inputs which are connected to the electrodes through to an individual output. Thereby, the electrodes of the columns are combined at the first sequentialization element and the electrodes of the rows of the matrix-like interconnection of the sensor cells are combined at the second sequentialization element, so that in each case one sensor cell, which is located at the intersection point of the two selected electrodes, can be measured at the outputs. In this way, all of the sensor cells can be sampled one after the other by having the first sequentialization element connecting one after the other the electrodes of the rows to the output and by having the second sequentialization element connecting one after the other the electrodes of the columns to the output.

By the over-occupation of the sequentialization elements, i.e. by the sequentialization elements being connected to both the electrodes of the rows and also to the electrodes of the columns, the sensor cells can be bridged. Therefore, simultaneously connecting the sequentialization elements to the same electrode establishes a direct electrical connection between the output of the first sequentialization element and the output of the second sequentialization element. The resulting "short circuit" between the outputs can be determined and tested by measurement, that is to say a specific measurement value is expected to be present between the outputs when there is a direct connection between the outputs. If the value which is determined by the measurement differs from the expected value, there is a fault in the addressing of the first or of the second sequentialization element, which can be advantageously be determined by the existing evaluation unit. The evaluation unit provides an output signal depending on the evaluation of the sensor cells and of the self-test and on the basis of said output signal a superordinate control unit can move the machine into a safe state in the event of a fault.

Therefore, the self-test of the sequentialization elements is advantageously performed without any additional components or monitoring circuits. Only the input width of the sequentialization elements is increased, such that all electrodes of the columns and rows can be assigned to an input of each of the first and the second sequentialization element respectively. However, such an arrangement is more cost-effective than providing a separate monitoring circuit for each sequentialization element.

Furthermore, it is advantageous that the existing evaluation unit can be used for the self-test and no additional test devices are required. Similarly, monitoring can be easily integrated into the normal measurement process by connecting the sequentialization elements to the same electrode subsequent to the normal measurement, in order to test the addressing of said sequentialization elements. Therefore, monitoring can be continuously performed in a simple manner following the normal measurement.

Finally, over-occupation of the sequentialization elements permits additional test possibilities in the signal processing chain since the sensor can be completely taken out of the signal processing chain. Therefore, the functionality of the inputs of the evaluation unit can advantageously also be tested in this way.

Therefore, the novel sensor firstly permits simple and cost-effective monitoring of the sequentialization elements of a matrix-like sensor arrangement and secondly further elements of the signal processing chain can be tested in a simple manner by the sensor being "bridged". Hence, the abovementioned object is achieved in full.

In an advantageous refinement, the sensor has a resistor which is arranged between the terminal of the first potential and the second sequentialization element. The refinement has the advantage that a fixed expected value for checking the sequentialization element can be defined in a simple manner. Particularly when the first potential is a ground potential, a resistor is required in order to be able to carry out meaningful measurement. Furthermore, if the output of the first sequentialization element is connected to a constant voltage source, the expected value is given directly by the voltage drop across the resistor when the sequentialization elements are correctly "short-circuited". If the sequentialization elements are incorrectly connected or their addressing being incorrect, the measured voltage differs from the expected voltage.

In a further advantageous refinement, the resistor can be adjusted in a variable manner. This refinement has the advantage that the expected value can be adapted for different measurement processes. For example, when measuring the sensor cells, the resistance can be reduced in order to minimize power loss, whereas for a self-test of the sequentialization elements a higher resistance allows a more precise measurement.

In a further advantageous refinement, the sensor has a further terminal for supplying a second potential, wherein the terminal of the second potential is connected to the first sequentialization element by means of a series resistor parallel to the evaluation unit. This further refinement has the advantage that the measurement is further improved by the expected value being determined by two resistors and the measurement being performed at the resulting voltage divider.

In a further advantageous refinement, the series resistor is also variable. This refinement has the advantage that, in addition to the free choice of the expected value, the evaluation unit, in particular, an analog/digital converter located at the input of the evaluation unit can be tested over the entire measurement range by the voltage divider being appropriately adapted. This is possible when the sensor cells are blanked out by suitable switching of the sequentialization elements, and therefore only the variable voltage divider is connected to the evaluation unit. Thereby, an additional monitoring function of the evaluation unit is provided in a simple manner.

In a further advantageous refinement, the sensor further has a first level and a second level, wherein the first and the second electrode are arranged in the first level and the third electrode is arranged in the second level, wherein the first and the second level are spaced apart from one another by the pressure-sensitive material. This refinement has the advantage that the sensor comprising a large number of sensor cells can be manufactured particularly easily. The first layer and the second layer are substantially identical and can be manufactured in one piece. The matrix-like arrangement of the sensor cells which are formed at the intersection points of the electrodes of the first and the second layer, is being formed not until the two layers are being laid one on the other. The electrical properties of the sensor cells are determined by the pressure-sensitive material which is arranged continuously between the two layers. Therefore, the sensor is advantageously made up only of three basic elements.

In a further advantageous refinement, the sensor further has a first orientation for the first and the second electrode and a second orientation for the third electrode and also comprises an intermediate region, wherein the intermediate region spaces apart and electrically insulates the first and the second electrode in the first level. The refinement has the advantage that the electrodes can be of substantially strip-like design and the shape of a sensor cell is determined substantially by the orientation of the electrodes in relation to one another. The different orientation of the electrodes is advantageously given by the angle at which the electrodes are arranged in relation to one another. The electrodes of the first and the second layer are advantageously arranged orthogonally in relation to one another in order to produce rectangular sensor cells. The width and, in particular, the distance of the sensor cells in relation to one another can be determined by the intermediate region.

In a further advantageous refinement, the sensor further has a further conductive path and a through connection, wherein the further conductive path is arranged in the intermediate region and has the first orientation, and the through connection electrically connects the further conductive path to the third conductive path. This refinement has the advantage that both the contact-making connections of the electrodes of the first level and the electrodes of the second level are unified in one level. Owing to the further conductive path with the same orientation as the electrodes on the first level, the connections, which make contact with the electrodes, for all of the electrodes can advantageously be arranged on one side of the sensor. That is to say, the contact-making connections both of the first and the second electrode of the first level and also of the third electrode of the second level can be uniformly led out at one point in the first level. Thereby, combining the electrodes of the first and also the second sequentialization element is simplified.

In a further advantageous refinement, the first level and the second level are formed from fabric comprising electrically conductive and electrically non-conductive yarn, wherein the first, the second and the third electrode of conductive yarn are woven into the fabric. This refinement has the advantage that a flexible sensor of large surface area can be created in a simple manner. In particular, the strip-like electrodes can be manufactured in a simple manner by an electrically conductive or electrically non-conductive yarn selectively being used during weaving. Thereby, a woven fabric with strip-like electrodes and insulating intermediate spaces is produced.

In a further advantageous refinement, the pressure-sensitive material is an electrically non-conductive flexible material which is in the form of a sieve and deforms under mechanical loading, so that the first and the second electrode of the first layer can partially make contact with the third electrode in the second layer in the region of the mechanical loading. This refinement has the advantage that the resistance of a sensor cell is not dependent on the intrinsic electrical properties of the pressure-sensitive material but rather solely on the elasticity of the said pressure-sensitive material and the size and shape of the sieve-like grid. The specific resistance of the pressure-sensitive material is therefore determined from the number of times the electrodes which are spaced apart by the pressure-sensitive material make contact. The greater the number of contact points resulting from the mechanical loading of the pressure-sensitive material in the region of a sensor cell, the lower the electrical resistance of the sensor cell.

It goes without saying that the abovementioned features and those still to be explained below can be used not only in the respectively indicated combination but also in other combinations or on their own without departing from the scope of the present disclosure.

BRIEF DESCRIPTION OF THE DRAWINGS

FIG. 9 is a perspective illustration of a preferred exemplary embodiment of a rear side of a novel safety mat.

DESCRIPTION OF PREFERRED EMBODIMENTS

Figure 1:
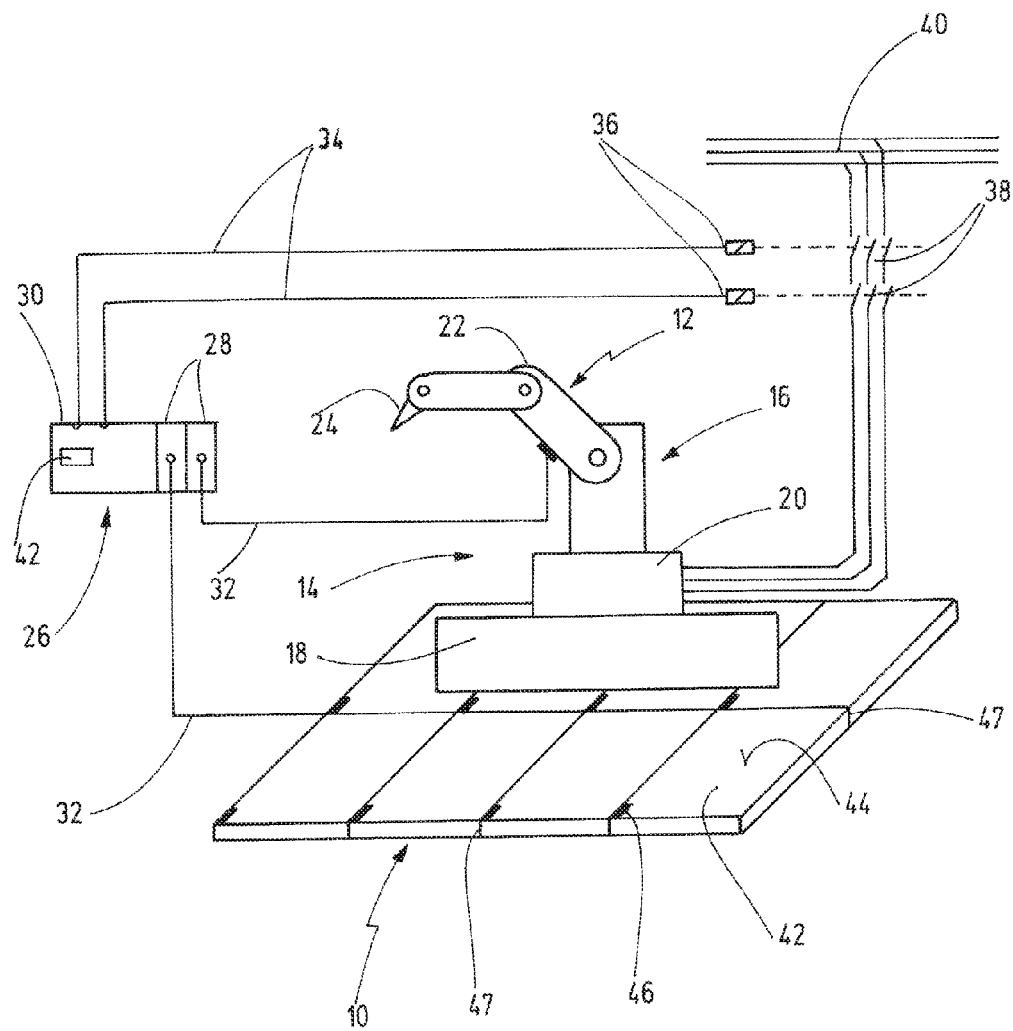
FIG. 1 is a schematic illustration of possible fields of application of exemplary embodiments of the novel safety device.

In FIG. 1, a first pressure-sensitive safety device and a second pressure-sensitive safety device are identified overall by reference numerals 10 and 12. The first and the second pressure-sensitive safety device serve to protect a technical installation 14 which is specified here as a robot 16 which operates in an automated manner. The robot 16 may be, for example, a cutting or welding robot in a production or assembly line.

The robot 16 is mounted on a holder 18 and can be rotated about its own axis by means of a drive 20. Furthermore, the robot 16 has a robot arm 22 which has a tool 24 at its end. The rotation and pivot region of the robot arm 22 defines an action region of the robot 16, which at the same time corresponds to a hazardous region of the robot 16. Entry into this region—both unauthorized and authorized—has to be identified so that the robot can be moved to a state which is not hazardous to persons. Here, the identification process is performed by the pressure-sensitive safety devices 10 and 12 which are coupled to a safety system 26. The safety system 26 can be an output signal switching device within the meaning of EN ISO 13856-1, for example a simple safety switching device, a configurable safety controller or else a programmable control unit. The safety system 26 is configured to move the technical installation 14 into a state which is not hazardous to persons, for example by the technical installation being switched off.

FIG. 1 shows a modular safety system 26 which has input modules 28 and an output module 30. The input modules 28 are coupled to the pressure-sensitive safety devices 10, 12 via lines 32. In the present exemplary embodiment, the output module 30 is connected to contactors 36 via a redundant line 34, the operating contacts 38 of the said contactors 36 being arranged in a power supply 40 of the electric drive 20. A processing unit 42 drives the contactor 36, in order to switch off the robot 16 in the event of a hazard, depending on the signals from the pressure-sensitive safety devices 10, 12, which are applied to the input modules 28. It goes without saying that switching off the technical installation 14 is only one possible option of moving the technical installation to a safe state. As an alternative or in addition, in another exemplary embodiment, the safety system 26 can also influence control of the movement of the robot 16 in order to establish a safe state, for example by having the robot 16 retract the robot arm 22. Further, it is likewise feasible for the processing unit 42 to take into account the combined signals from the first pressure-sensitive safety device 10 and the second pressure-sensitive safety device 12 or any further safety devices in order to make a decision about how to drive the robot 16 based on joint consideration. Further safety devices can be, for example, non-contact safety devices (BWS) such as light barriers or light grids, or else a safety camera system.

In the exemplary embodiment according to FIG. 1, the first pressure-sensitive safety device 10 is a safety mat, in particular a switching mat within the meaning of EN ISO 13856-1, which is laid on the floor around the holder 18 of the robot 16. In this exemplary embodiment, the safety mat is modular and comprises eight safety mat modules 42 forming two rows each comprising four modules. Each safety mat module 42 comprises a sensor with an active sensor area 44 and an evaluation unit 46. The active sensor area 44 is pressure-sensitive, as will be explained in greater detail with reference to the following figures. The evaluation unit 46 is configured to register a load on the pressure-sensitive active sensor area 44 and to provide an output signal depending on the said load. The evaluation unit 46 can be a digital or analog circuit, a microcontroller, a FPGA, an ASIC or any other signal-processing unit.

In this exemplary embodiment, the output signal from the evaluation unit 46 is a signal which can indicate a first state and a second state. A safe state is preferably indicated by an active output signal (always on). Particularly preferably, the output signal is an OSSD signal, i.e. a redundant signal with two clock signals which are not synchronized with one another. The output signals from the individual evaluation units 46 can be transmitted individually or in a combined manner to the input module 28 of the safety system 26 via the line 32. If there is no output signal at all or the output signal does not reach the input module 28 in the expected form, the above-described safety function is executed by the safety system 26 and the technical installation 14 is switched off by means of the contactor 36.

The safety mat which is composed of the individual safety mat modules 42 comprises a substantially continuous sensor surface which is formed from the individual active sensor areas 44 of the safety mat modules 42. In this regard, substantially continuous means that safety-relevant identification can also take place in the transition regions of adjacent safety mats and the passive boundary regions are correspondingly minimized. In the exemplary embodiment according to FIG. 1, a safety mat module 42 has a cuboidal supporting body with an extended base. The base has a top side and rear side which have a large surface area in comparison to the side faces. The active sensor area 44 of the safety mat modules 42 completely covers the top side of the base. The effective operating area of the safety mat module therefore extends virtually over the entire surface of the safety mat module 42. In a combination of a plurality of safety mat modules, the effective operating area extends as far as the butt joints 47 between two adjacent safety mat modules 42, in order to form a virtually seamless operating area of the safety mat. In one exemplary embodiment, the supporting body additionally has a narrow border which surrounds the base to fasten a further protective layer onto this border in order to achieve a particularly high International Protection Marking (IP67).

In order to identify actuation of the safety mat, the evaluation units 46 of the individual safety mat modules 42 are also combined to a compound. This preferably takes place beneath the active sensor areas 44 in the interior of the safety mat modules 42 or on the rear side of the said safety mat modules. In one exemplary embodiment, the evaluation units 46 are connected in series, wherein the first or last evaluation unit 46 of the chain is connected to the input module of a safety system. The series circuit is designed such that, as soon as there is no output signal from an evaluation unit 46, an actuation of the entire safety mat is signalled to a safety system connected thereto. However, in other exemplary embodiments, a different combination of the individual evaluation units 46, for example a master and slave composition, and also different signal processing are feasible. Therefore, in one exemplary embodiment, the detected values may be directly passed on by the individual evaluation units 46 to the safety system which independently decides how the actuation of a safety mat module is to be assessed.

In the exemplary embodiment according to FIG. 1, the technical installation 14 is arranged on the safety mat and the effective surface. In other preferred exemplary embodiments, the safety mat is arranged around the holder 18 of the technical installation 14. If the installation is positioned on the effective surface, the safety mat or the individual safety mat modules have to be configured such that a region on which the technical installation 14 is positioned can be blanked out. In other words, the safety mat has to be of spatially resolving design in order to identify which regions of the active sensor area have been actuated. By means of the spatial resolution, individual regions on which the technical installation 14 is positioned can remain unevaluated.

In the exemplary embodiment according to FIG. 1, the second sensor 12 likewise comprises an active sensor surface 44 and an evaluation unit 46 which is connected to an input module 28 of the safety system 26 via a line 32. The active sensor area 44 of the second sensor 12 is arranged on a surface of the technical installation 14, here in particular on the robot arm 22. The active sensor surface 44 is flexible and matches the contour of the surface of the technical installation 14. As in the case of the safety mat, a plurality of active sensor areas 44 may be combined to form a composite in this exemplary embodiment, in order to increase the size of the effective operating area. Preferably, the part of the robot which is moving in space is completely covered by the active sensor surface 44.

In the exemplary embodiment according to FIG. 1, the robot arm 22 has two cylindrical components, the active sensor surface 44 being arranged on the cylindrical surface of the said cylindrical components. In contrast to the first sensor 10, the second sensor 12 is designed not to monitor access to the technical installation 14 but rather to detect an object or a person getting in contact with the robot arm 22. As in the case of the first sensor 10, the evaluation unit 46 of the second sensor generates an output signal, based on which the safety system 26 is able to control, in particular switch off, the robot 16. The technical design of the first and the second sensor 10, 12 will be explained in greater detail with reference to the following figures. Identical reference symbols denote identical parts.

Figure 2:
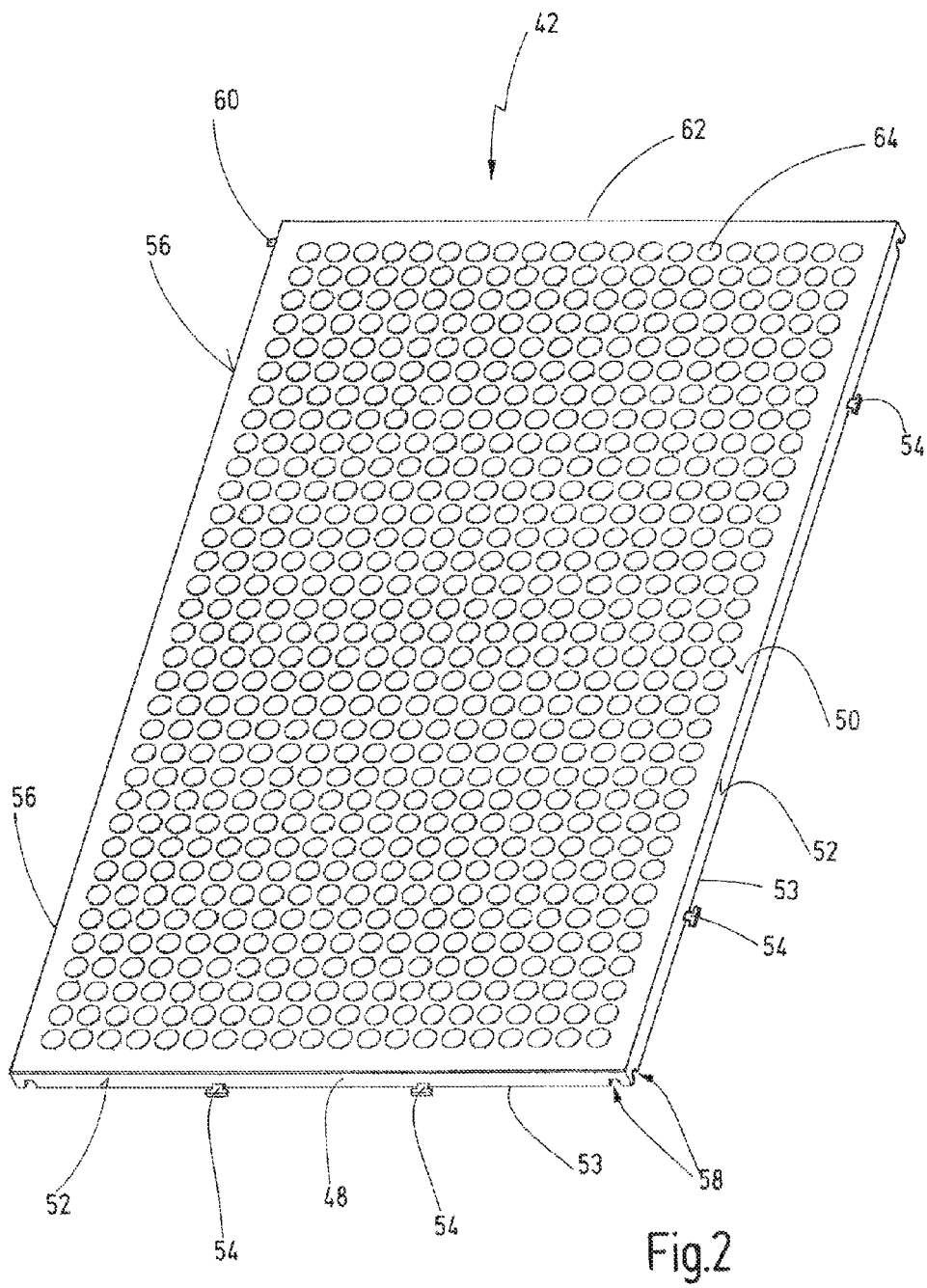
FIG. 2 is a perspective illustration of an exemplary embodiment of a novel safety mat.

FIG. 2 is a perspective illustration of an exemplary embodiment of a safety mat module 42 of the first pressure-sensitive safety device 10 shown in FIG. 1. The safety mat module 42 has a rigid supporting body 48 with a planar surface 50 of large surface area and narrow side faces 52 perpendicular to the surface 50. In the exemplary embodiment according to FIG. 2, the planar surface 50 is rectangular and the safety mat module 42 is cuboidal overall, so that the surface 50, the rear side and the side faces 52 are arranged orthogonally to one another. It goes without saying that in other exemplary embodiments other forms are feasible. In particular, a triangular, diamond-shaped or hexagonal form of the surface are conceivable, that is to say in particular forms with which a surface can be filled without gaps (parqueted).

In the exemplary embodiment according to FIG. 2, the safety mat module 42 is 60 cm wide and 1 m deep and 3 cm high. The surface 50 preferably has an area of between 0.25 $m^2$ and 1 $m^2$. These dimensions are particularly suitable for laying the safety mat modules 42 like normal tiles. In the present exemplary embodiment, T-shaped connecting elements 54 are arranged on the bottom of two side edges 53 of the safety mat module, which protrude perpendicularly from the safety mat module 42. On the side edges which are situated opposite the two side edges 53 receptacles 56 which are situated opposite of the connecting elements 54 are arranged. The receptacles 56 are T-shaped cavities on the rear side of the supporting body 48 corresponding to the connecting elements 54, so that two adjacent safety mat modules 42 can lie flush against one another and can be fixed by the receptacles 56 and the connecting elements 54 engaging one in the other. It goes without saying that in other exemplary embodiments other connecting means are conceivable. For example, in one exemplary embodiment, the connecting elements can be separate components with a double-T-shaped contour which are inserted into the receptacles 56 as required. In another exemplary embodiment, U profiles, for example composed of aluminium, can also be used for holding the safety mat modules together.

In the exemplary embodiment according to FIG. 2, further cavities are arranged in the side faces 52, wherein in at least one of these cavities 58 a plug connector 60 for making electrical contact with an adjacent safety mat module 42 is arranged. A plug (not illustrated here) which fits the plug connector 60 can be arranged in a further cavity 58. An evaluation unit of the safety mat module 42 is arranged within the supporting body 48 (likewise not visible here). The evaluation unit can be connected to a safety system or else to a further evaluation unit of an adjacent safety mat module 42 by means of the plug and plug connector 60. In one exemplary embodiment, each switching mat requires a termination plug. Preferably, the plug connector 60 can be arranged in different cavities 58, wherein cavities 58 are preferably provided in all of the corner regions of the safety mat module 42. Thereby, the safety mat can be combined to an assembly in a particularly simple and flexible manner.

In the present exemplary embodiment, the planar surface 50 is completely covered by an elastic rubber mat 62, for example a mat which is composed of polyurethane, so that the sensor which is situated beneath said mat is hidden. The rubber mat 62 is preferably fixed on the planar surface 50 and on the transitions of the side faces 52 such that water, dust and other impurities cannot enter the interior of the supporting body 48. The rubber mat 62 and the supporting body 48 are particularly preferably configured such that the safety mat module 42 complies with international protection class IP67. The same applies for the plug and the plug connector 60. The active sensor area and also the evaluation unit of the safety mat are arranged beneath the rubber mat 62, which has here nubs 64 on its surface, in order to minimize the risk of slipping. The pressure-sensitive active sensor area extends beneath the rubber mat 62 over the entire planar surface 50 of the base of the supporting body 48 and defines the active region of the safety mat module 42. In one exemplary embodiment, the active region extends over the entire planar surface 50 of the supporting body 48. It goes without saying that an individual safety mat module 42 can be used as an independent safety mat, without being part of an assembly.

Figure 3:
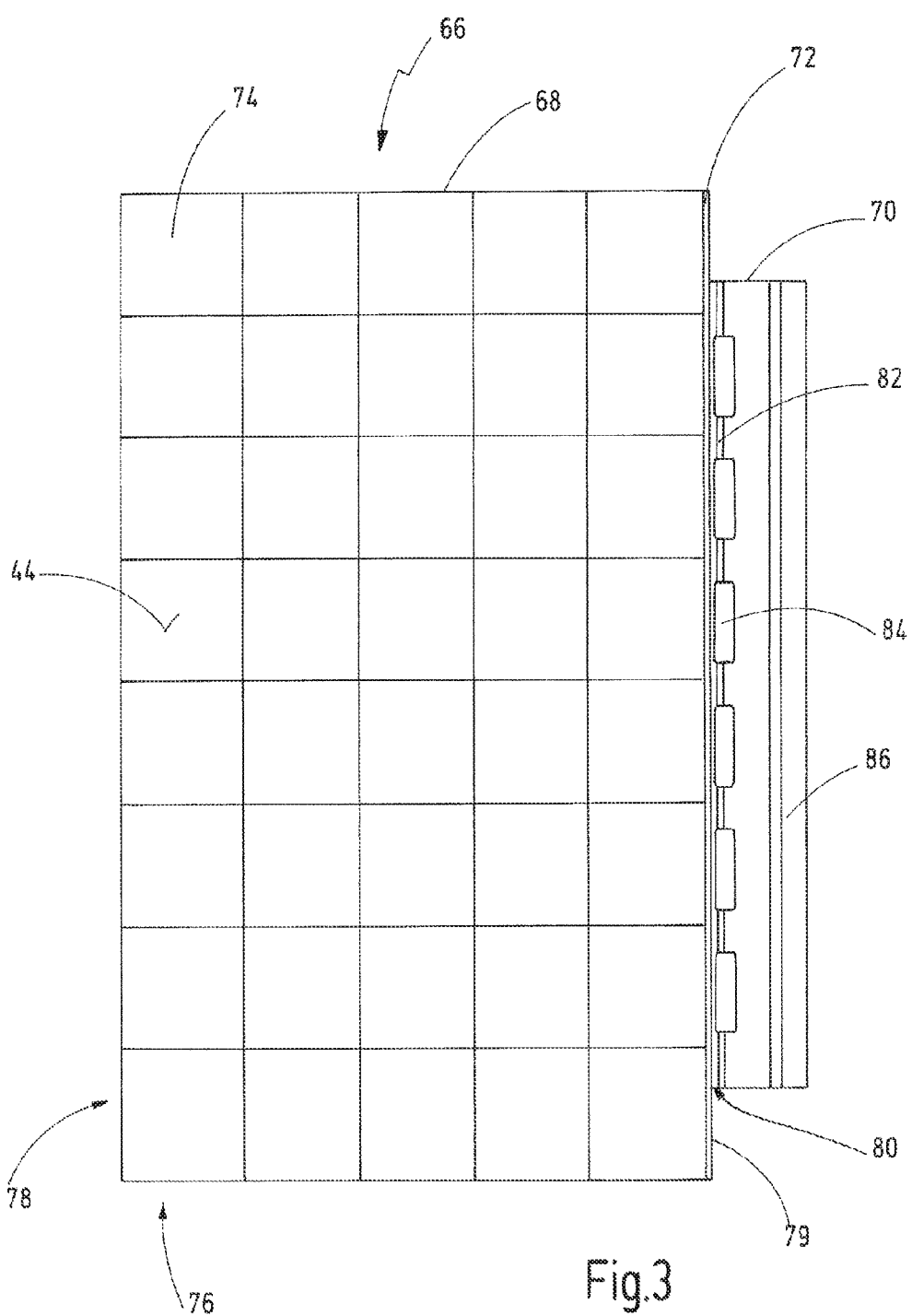
FIG. 3 shows an exemplary embodiment of a sensor of the novel safety mat.

FIG. 3 shows a preferred exemplary embodiment of a sensor 66 for a safety mat module 42. In addition to a matrix-like sensor arrangement 68 which forms the active sensor area 44, the sensor 66 has a connection region 70 for connecting the sensor arrangement 68 to an evaluation unit. The sensor arrangement 68 and the connection region 70 of the sensor 66 are manufactured from a common carrier material 72. The carrier material 72 is preferably a flexible, textile-like woven fabric into which electrical structures are woven. The electrical structures in the fabric are created by the use of conductive and non-conductive yarn. The carrier material 72 is so flexible that it can be rolled up and folded like any fabric. In addition to the carrier material 72, the sensor arrangement 68 has a further fabric-like material which substantially determines the pressure-sensitive properties of the sensor arrangement 68.

The sensor arrangement 68 is formed from the carrier material 72, the electrical structures on the carrier material 72 and the pressure-sensitive material. The electrical structures form individual sensor cells 74 which are arranged in rows 76 and columns 78 in a matrix-like manner. The mechanical load can be determined for each sensor cell 74, in order to determine an overall pressure distribution over the sensor arrangement 68 and therefore over the active sensor area 44, as will be explained in even greater detail with reference to FIG. 4.

In this exemplary embodiment, the connection region 70 is formed on a side edge 79 of the sensor arrangement 68. In other exemplary embodiments, the connection region 70 can also be formed on a plurality of side edges of the sensor arrangement 68. The connection region 70 is an extension of the carrier material 72 and the electrical structures thereon. In other words, the sensor arrangements 68 and the connection region 70 are manufactured substantially from one piece. The connection region 70 is likewise of flexible design. The connection region 70 can be folded along a kink edge 80 which runs along the side edge 79 of the sensor arrangement 68 at the transition to the connection region 70. The connection region 70 is configured to be placed around the kink edge 80, that is to say the connection region 70 can be folded under the sensor arrangement 68 around the kink edge 18. In FIG. 3 the unfolded sensor is shown.

The connection region 70 can extend over the entire length of a side edge 79 of the sensor arrangement 68 or, as in the exemplary embodiment according to FIG. 3, only over a subregion of the side edge 79. The connection region 70 has cavities 84 in a fold-over region 82 which starts from the side edge 79. The fold-over region 82 extends from the kink edge 80, over the entire length of said kink edge, preferably 1 to 2 cm into the connection region 70. The cavities 84 are passage openings in the connection region 70 and are arranged on a straight line parallel to the kink edge 80. The cavities 84 are preferably rectangular, slot-like cavities in the carrier material 72 which are arranged in the fold-over region 82.

The connection region 70 further has a contact-making region 86. Contact can be made with the electrical structures in the contact-making region 86 in order to be able to establish an electrical connection to an evaluation unit. Preferably, insulated cables are woven into the carrier material 72 in the contact-making region 86, wherein the insulation of the cables has been removed at those points at which contact is intended to be made with the electrical structures. This can be performed, for example, by subsequently removing the insulations of the cables at precise points with a laser. The sensor arrangement 68 and the electrical connection thereof are explained in greater detail in FIG. 4.

Figure 4:
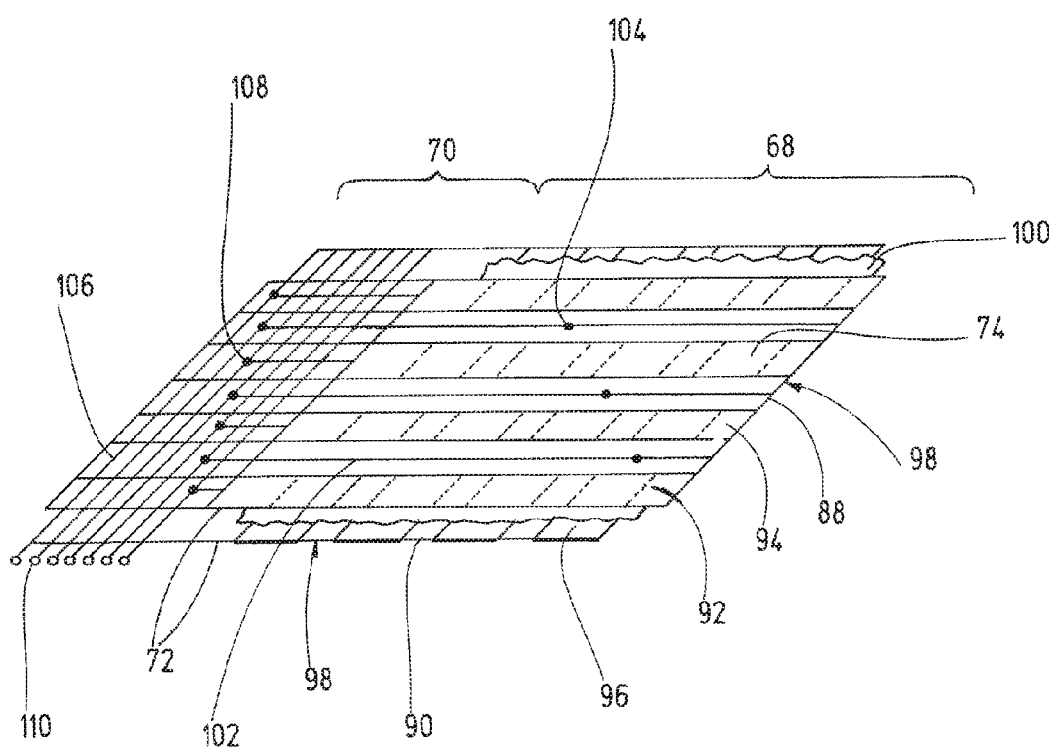
FIG. 4 is a schematic illustration of a further exemplary embodiment of a sensor.

FIG. 4 is a schematic illustration of an exemplary embodiment of a sensor arrangement 68 and also the electrical connection thereof in a connection region 70. The sensor arrangement 68 has a first layer 88 and a second layer 90, which are each manufactured from the carrier material 72. Electrical structures, as described above, are arranged on the first layer 88 and the second layer 90. The electrical structures of the first and the second layer 88, 90 are formed from strip-like electrodes 92, 94, 96. The electrodes of the respective layer are arranged parallel to one another and are spaced apart by insulating intermediate regions 98. The first layer 88 and the second layer 90 are preferably manufactured from one piece which is divided into two parts after manufacture, wherein the two parts are placed above one other and rotated by 90° in relation to one another to form the matrix-like sensor arrangement 68.

A further layer 100 which is composed of pressure-sensitive material is arranged between the first layer 88 and the second layer 90. The further layer 100 is preferably composed of a non-woven, conductive fabric. Particularly preferably, the further layer 100 is a non-woven microfibre cloth which is coated with a conductive coating. The pressure-sensitive material of the further layer 100 is configured such that, when it is mechanically loaded, it changes the electrical properties between two opposite electrodes.

The sensor cells 74 of the sensor arrangement 68 are formed in the overlap regions (illustrated using dashed lines here) of the electrodes 92, 94 of the first layer 88 and the electrodes 96 of the second layer 90. It goes without saying that the other electrodes of the first and the second layer form further sensor cells 74. Therefore, contact can be made with each sensor cell 74 by an electrode of the first layer 88 and an electrode of the second layer 90. The pressure-sensitive material of the further layer 100, which pressure-sensitive material determines the electrical properties of the sensor cell 74 when it is mechanically loaded, is arranged between the electrodes of a sensor cell 74. The electrical property of a sensor cell 74 is preferably determined by means of the specific electrical resistance of the sensor cell 74 which can be measured using the electrodes of the sensor cell 74. A change in the specific electrical resistance due to a mechanical load on the sensor cell 74 can arise in various ways. For example, in one exemplary embodiment, when the further layer is mechanically loaded, the specific electrical resistance of the said further layer changes at the site of the loading. In another preferred exemplary embodiment, the change in resistance due to a load is caused by a change in the contact area from the electrodes of the first and the second layer 88, 90 to the conductive material of the further layer 100. That is, the first and the second layer with the electrodes 92, 94, 96 adapt under pressure to the rough, conductive material of the further layer 100 and as a result of which the size of the contact area is increased and the resistance falls. Alternatively, a change in resistance is caused by a change in geometry of the conductive material of the further layer 100 as a result of mechanical loading.

In a further exemplary embodiment, the pressure-sensitive material is an electrically non-conductive flexible material which is in the form of a sieve and deforms under mechanical loading, so that the first and the second electrode of the first layer can partially get in contact with the third electrode in the second layer in the region of the mechanical loading. The electrical resistance of a sensor cell is then dependent on the elasticity, the size and the shape of the sieve-like grid. The electrical resistance of a sensor cell is then determined by the number of times the electrodes which are spaced apart by the pressure-sensitive material make contact. The greater the number of contact points resulting from the mechanical loading of the pressure-sensitive material in the region of a sensor cell, the lower the electrical resistance of the sensor cell.

Preferably, the electrodes 92, 94 of the first layer 88 and the electrodes 96 of the second layer 90 are contacted on one side of the sensor arrangement 68. As described above, contact is made in a connection region 70 which is formed from an extension of the carrier material 72 of the first and/or of the second layer. In the exemplary embodiment according to FIG. 4, both the carrier material 72 of the first layer 88 and the second layer 90 are extended into the connection region 70. However, only the electrodes of the first layer 88 are extended into the connection region 70 here as well as further conductive paths 102 which are arranged parallel to the electrodes in the intermediate regions 98 of the first layer 88. The conductive paths 102 are woven into the carrier material 72, like the electrodes 92, 94. The conductive paths 102 can extend over the entire width of the first layer 88, like the electrodes 92, 94. Furthermore, the sensor arrangement 68 has through connections 104 which electrically connect the further conductive paths 102 to the electrodes 96 of the second layer 90. Like the electrodes, the through connections 104 are composed of conductive yarn, but are routed orthogonally to the first and the second layer from the first layer 88, through the further layer 100, to the second layer 90.

Insulated cables 106 which run perpendicular to the electrodes 92, 94 of the first layer 88 and the further conductive paths 102 are arranged in the connection region 70. The insulation of the cables 106 is removed at individual contact points 108, so that an electrical connection can be made between the electrodes 92, 94 of the first layer or one of the further conductive paths 102 and the insulated cables 106 at these points. The insulated cables 106 are routed out of the carrier material 72 on one side of the connection region 70 and provided with connections 110, for example in the form of a connector strip. The insulated cables 106 and therefore the electrodes 92, 94, 96 of the first and the second layer 88, 90 can be connected to an evaluation unit (not illustrated here), which can determine by means of the connections 110 the resistances within the sensor cells 74.

Figure 5:
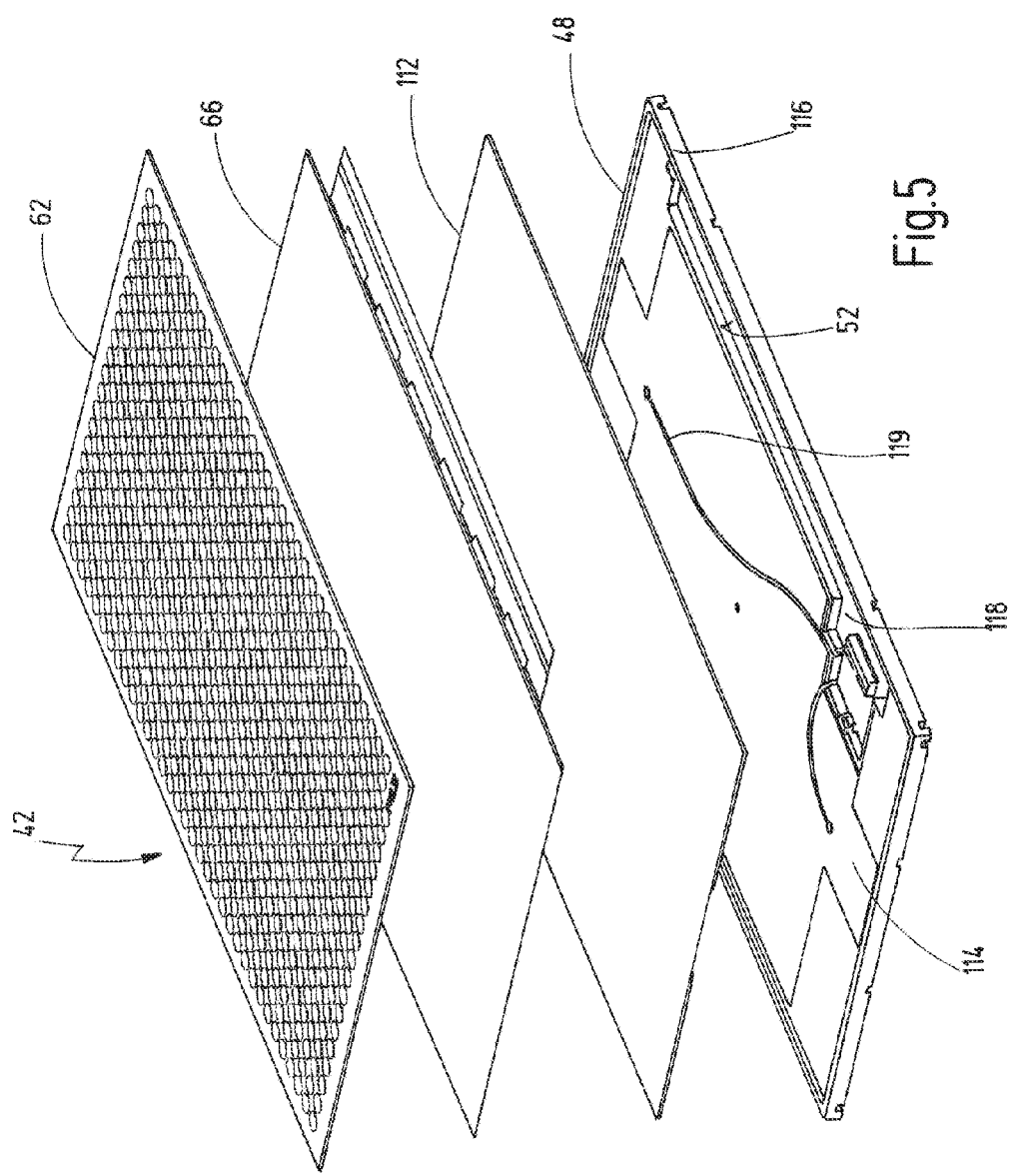
FIG. 5 is an exploded assembly drawing of an exemplary embodiment of a novel safety mat.
Figure 6:
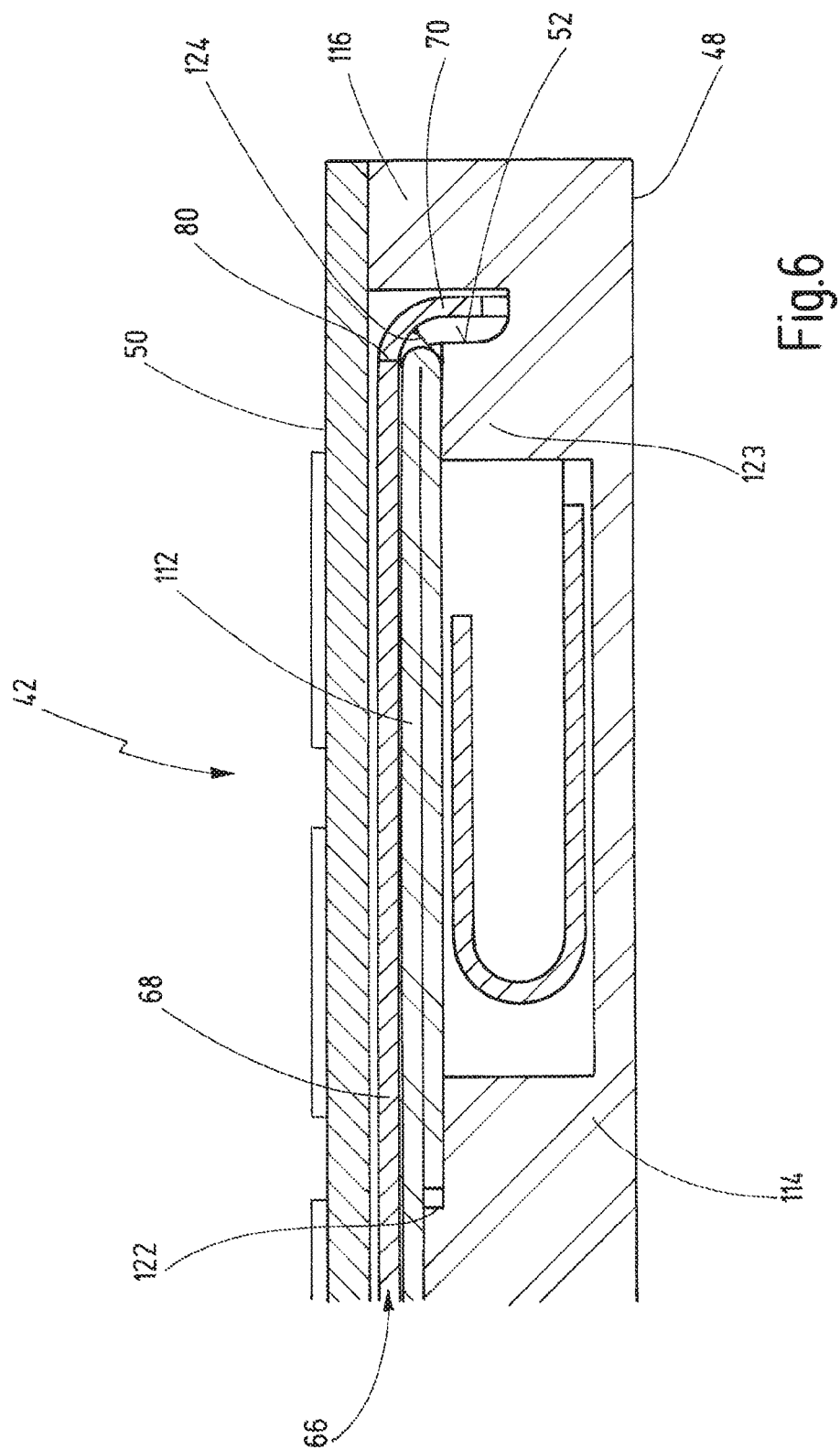
FIG. 6 shows a sectional drawing of an exemplary embodiment of a novel safety mat.

FIGS. 5 and 6 show a preferred exemplary embodiment of a safety mat module 42 in an exploded assembly drawing and in a sectional drawing. Once again, identical reference numbers denote identical parts.

FIG. 5 shows the layered composition of the safety mat module 42. The first level forms the slip-resistant rubber mat 62 beneath which the sensor 66 is arranged. The sensor lies on a cover plate 112 which is configured to be inserted into the supporting body 48. The cover plate 112 is dimensioned such that it is completely covered by the sensor arrangement 68 of the sensor 66, while the connection region 70 of the sensor 66 protrudes beyond the cover plate 112. The connection region 70 likewise protrudes beyond the rubber mat 62. Therefore, in an assembled state, the rubber mat 62, the cover plate 112 and the sensor arrangement 68 form a layered assembly, from which the connection region 70 protrudes.

In this preferred exemplary embodiment, the supporting body 48 has a base 114 with a circumferential, protruding border 116. The cover plate 112 and the sensor arrangement 68 lie on the supporting body. The cover plate 112 is fixed on the supporting body 48 in a force-fitting or cohesive manner by a plurality of adhesion points having a diameter and depth as bores in the supporting body selected such that on the one hand different thermal expansion characteristics can be compensated for and on the other hand the tensile forces of the adhesive layer do not lead to a deforming of the safety mat due to a change in temperature. In another exemplary embodiment, the cover plate 112 can also be fixed to the border 116 by an interlocking connection. Furthermore, the cover plate 112 can have one or more press-in bolts and the supporting body 48 can have corresponding bores in order to orient the cover plate 112 with respect to the supporting body 48.

The rubber mat 62 extends beyond the cover plate 112 and the sensor arrangement 68 to such an extent that the top side of the border 116 is also covered by the rubber mat 62. Thereby, the cover plate 112 and the sensor arrangement 68 are embedded, preferably in a water- and dust-tight manner, within the supporting body 48 by the rubber mat 62 being adhesively bonded to the top side of the border 116. Structures 118 in form of cavities are incorporated into the base 114, in which the electronics of the safety mat module 42, for example the evaluation unit, are being arranged. The structures 118 can furthermore have cavities for cable harness 119 in order to connect the electronics to the outside.

FIG. 6 depicts a cross section of the safety mat module 42 across the kink edge 80 of the sensor 66. The sensor arrangement 68 lies on top of a cover plate 112 which, in turn, lies on top of the supporting body 48. The cover plate 112 can be a rigid metal plate which, in this exemplary embodiment, is folded at a one side by 180° and the folded section engages into a fold in the supporting body 48 in an interlocking manner in order to fix the metal plate on the supporting body. The connection region 70 is folded over a side face 52, which is perpendicular to the surface 50, in a radius 124. The radius 124 is preferably between 0.2 cm and 1 cm. During the folding, a protrusion 123 of the supporting body 48 which supports the cover plate 112 is guided through the cavity 84 in the connection region. Thereby, a force which is applied perpendicularly to the surface 50 does not affect the connection region 70, but is rather released past the connection region 70 through the protrusion 123 onto the supporting body 48. Therefore, the connection region 70 is not subjected to loading when a person steps onto the surface.

In the preferred exemplary embodiment according to FIG. 6, the supporting body 48 additionally comprises a border 116 around the supporting body. The slip-resistant rubber mat 62 is placed onto the border 116, so that the interior of the supporting body 48 is sealed. In another exemplary embodiment, the sensor arrangement 68 and the cover plate 112 may extend over the border, so that the connection region 70 is folded over the border 116 and guided into the interior of the supporting body 48. In this case, the border 116 has a groove-like profile into which the cavities 84 of the connection region 70 can engage, so that a force which applied onto the surface 50 is also released past the connection region 70.

Figure 7:
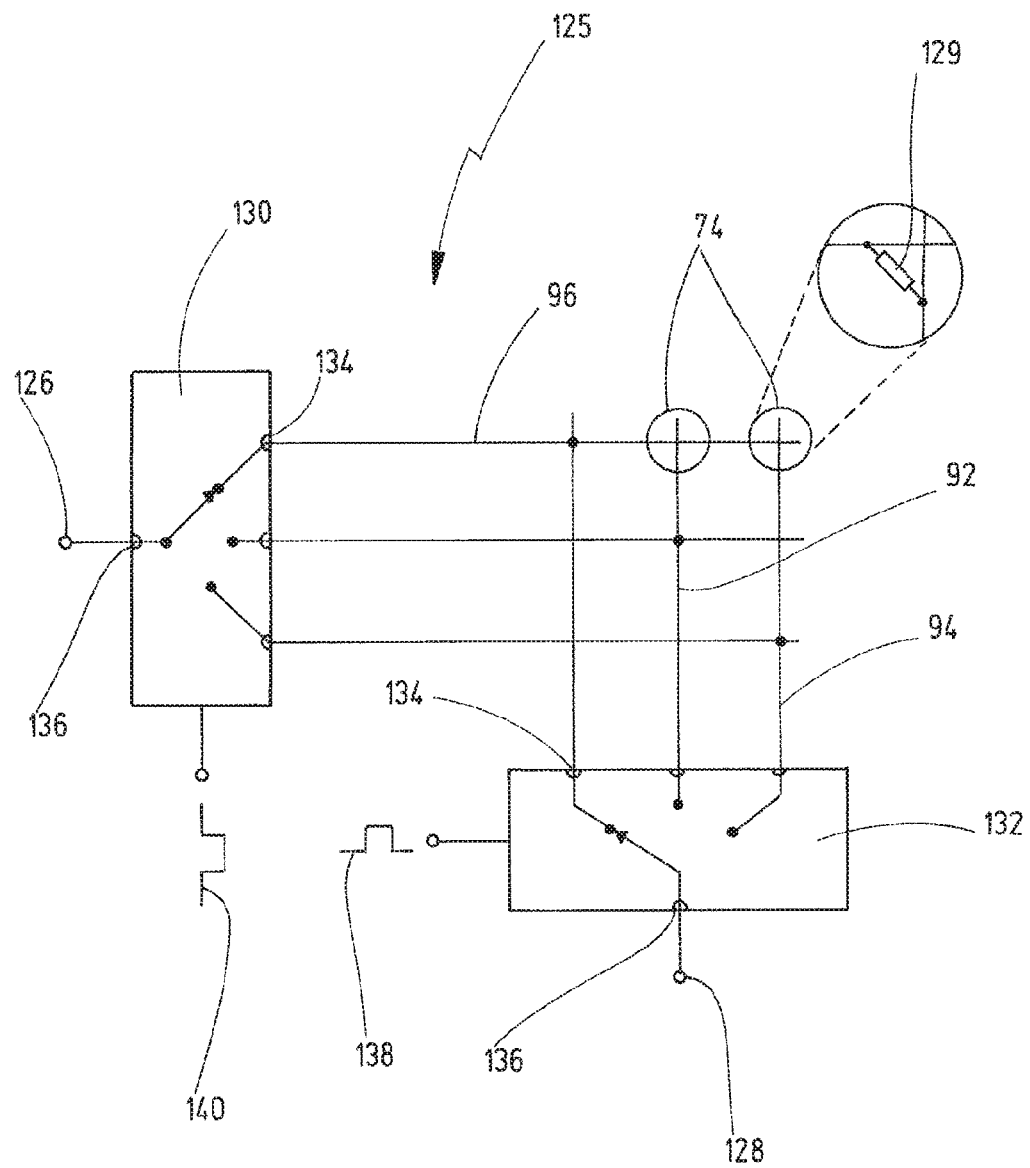
FIG. 7 is a schematic illustration of an exemplary embodiment of a connection circuit of a sensor.
Figure 8:
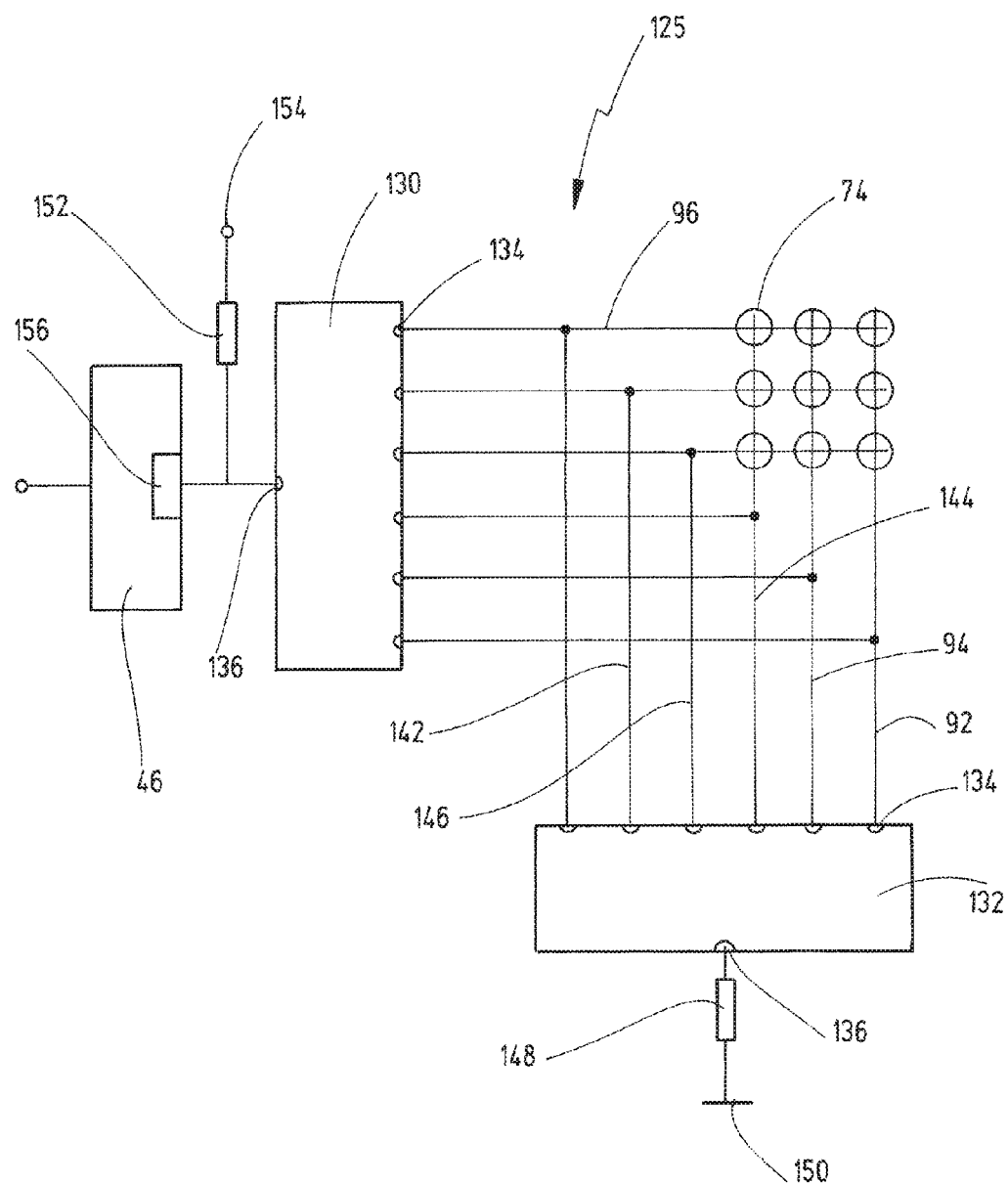
FIG. 8 is a schematic illustration of a preferred exemplary embodiment of a connection circuit of a sensor.

FIGS. 7 and 8 show two schematic illustrations of exemplary embodiments for contacting the sensor 66.

FIG. 7 shows a first and a second sensor cell 74 that can be connected to an evaluation unit (not illustrated here) by means of a circuit arrangement 125 having a first and a second terminal 126, 128. The sensor cells 74 are formed from a first electrode 92, a second electrode 94 and a third electrode 96. Between the electrodes of a sensor cell 74 a resistance 129 can be determined which, as explained above, is dependent on the mechanical load applied to the sensor cell 74.

The electrodes 92, 94, 96 are connected to a first sequentialization element 130 and a second sequentialization element 132. The first and the second sequentialization element 130, 132 are configured to combine a large number of connection terminals to a single connection terminal 126, 128. The sequentialization elements 130, 132 are preferably data switches, so-called multiplexers. A sequentialization element 130, 132 has a large number of inputs 134 and a single output 136. In a sequentialization element 130, 132, one output 136 is always connected to one of the inputs 134 at a specific time. A sequentialization element 130, 132 can be single, preferably integrated electronic device, or a combination of multiple individual switching device which are coupled together in order to form a single sequentialization element. Switching between the individual inputs 134 of the sequentialization elements 130, 132 is performed by an external trigger 138, 140. The external trigger 138, 140 can be provided directly by the evaluation unit or can be provided by an external clock signal. In the latter case, the cycle of the external trigger 138 of the second sequentialization element 132 is preferably one factor greater than the cycle of the external trigger 140 of the first sequentialization element 130. The ratio is selected such that the first sequentialization element 130 connects a first input of the inputs 134 to the output 136, while the second sequentialization element during the same time connects all of its inputs 134 at least once to the output 136. This way, all of the sensor cells 74 can be tested in succession in a simple manner by the respective electrodes being connected to the outputs 136 of the first and the second sequentialization element 130, 132 by the said sequentialization elements.

The first and the second sequentialization element 130, 132 are over-occupied at their inputs 134, i.e. the first sequentialization element 130 is connected not only to the electrodes 92, 94 of the first layer 88 but also to the electrodes 96 of the second layer 90. The second sequentialization element 132 is connected not only to the electrodes 96 of the second layer 90 but also to the electrodes 92, 94 of the first layer 90. As illustrated in FIG. 7, the outputs 136 can be connected to the same electrode (here the third electrode 96). In such a constellation of the first and the second sequentialization element 130, 132, the sensor cells 74 can be "bridged". Therefore a direct connection between the outputs 136 of the first sequentialization element 130 and the second sequentialization element 132 can be established.

Such a "short circuit" can be determined by measurement by an evaluation unit which is connected to the first and the second terminal 126, 128. If the first and the second sequentialization element 130, 132 are correctly connected, the evaluation unit can determine the corresponding short circuit between the first terminal 126 and the second terminal 128. In order to self-test the sequentialization elements 130, 132, the sequentialization elements are short-circuited at intervals and the short circuit is tested by the evaluation unit. Thereby, the functionality of the sequentialization elements 130, 132 as part of the signal-processing chain of the sensor can be continuously verified.

FIG. 8 shows a particularly preferred exemplary embodiment for contacting the matrix-like sensor 66. In the exemplary embodiment according to FIG. 8, nine sensor cells 74 are connected to an evaluation unit 46 by a first sequentialization element 130 and a second sequentialization element 132. In addition to the first, second and third electrodes 92, 94, 96, the circuit arrangement 125 has three further electrodes 142, 144, 146 which contact the further sensor cells 74. As in the exemplary embodiment above, all of the electrodes 92, 94, 96, 142, 144, 146 are each connected to the inputs 134 of the first and the second sequentialization element 130, 132. This way, not only each of the two electrodes of a sensor cell 74 can be connected to the outputs 136, but also a direct connection in the abovementioned manner can produced.

In the exemplary embodiment according to FIG. 8, the output 136 of the second sequentialization element 132 is connected to an electrical ground terminal 150 by means of a first resistor 148. The output 136 of the first sequentialization element 130 is on the one hand connected to a voltage source 154 by a second resistor 152 and on the other hand the output 136 of the first sequentialization element 130 is connected to an analog/digital converter (ADC) 156 of the evaluation unit 46. Thereby a voltage divider is being formed between the second resistor 152 and the first resistor 148 or between the second resistor 152 and the sum of the second resistor 152 and the resistor 129 of the sensor cells 74 to which the first and the second sequentialization element 130, 132 are connected. In other words, when the first sequentialization element 130 and the second sequentialization element 132 are "short-circuited", a defined voltage is established at the analog/digital converter 156, the said defined voltage being produced by the voltage divider of the first and the second resistor 148, 152 and the voltage of the voltage source 154. Secondly, the specific resistance 129 of a sensor cell 74 can easily be determined from the deviation from this expected value.

In this way, it is particularly easy to determine by the evaluation unit 46 the instantaneous resistance of a sensor cell 74 and therefore the corresponding pressure load on a sensor cell 74. Furthermore, the addressing of the sequentialization elements 130, 132 can be tested in a simple manner. Additional devices for monitoring the sequentialization elements 130, 132 are not required.

Furthermore, the analog/digital converter 156 may be tested for correct operation if the first resistor 148 and the second resistor 152 are each adjustable. Owing to the variable voltage divider which is present when the first and the second sequentialization element 130, 132 are connected to the same electrode, the entire region of the analog/digital converter 156 can be made verifiable. The results of the evaluation of the sensor cells 74 and also the results of the monitoring of the sequentialization elements and/or of the analog/digital converter 156 can be transferred to a superordinate control unit for further processing.

In one exemplary embodiment, the evaluation unit 46 can be an OSSD, that is the output signal is an OSSD signal which can indicate a first state and a second state. Preferably, the signal is a redundant clock signal with two components which are not synchronized with one another. The first state indicates a safe state of the sensor, i.e. a state in which a sensor cell 74 is not subjected to a load and no fault has been identified in either of the sequentialization elements 130, 132 or the analog/digital converter 156. The first state is actively signalled, that is to say the redundant signal has to be present in this state. The second state is signalled by there being no redundant clock signal and indicates that either a sensor cell 74 has been subjected to loading or there is a fault in the sequentialization elements 130, 132 or the analog/digital converter 156.

In another exemplary embodiment, the output signal from the evaluation unit 46 contains an encoded signal which contains information about which sensor cell 74 is subjected to loading or which sensor cell 74 is not subjected to loading. Similarly, the results of the self-test of the sequentialization elements 130, 132 and of the analog/digital converter 156 can be transmitted to a safety system, so that on the on hand an evaluation if the sensor 66 has been touched can be performed and on the other hand a diagnosis report which indicates the functionality of the sensor 66 and the signal processing thereof can be generated.

There are also intermediate configurations between the last two exemplary embodiments conceivable, for example an OSSD signal that is being provided by the evaluation unit and diagnosis data that is being provided by means of a second output at the same time. It goes without saying that the exemplary embodiment according to FIG. 8 can be extended to any desired number of sensor cells 74 and the disclosure is not limited to the nine sensor cells shown.

FIG. 9 is a perspective illustration of the rear side of a preferred exemplary embodiment of the novel safety mat. The rear side 160 of the safety mat corresponds to the bottom side of the supporting body 48. The rear side 160 substantially has a planar surface 162 into which structures are incorporated in order to enable the connection of the electronics which are situated inside the supporting body 48. The structures are incorporated into the planar surface 162, for example, by means of a surface milling process, or are formed directly during production of the supporting body 48, for example during injection-moulding.

In the exemplary embodiment according to FIG. 9, the structures have a passage opening 164, a first, second, third and fourth cable guide 166, 168, 170, 172 and also sockets 174a, 174b in the form of hollows in the rear side 160. The passage opening 164 is an opening which is perpendicular to the planar surface 162, preferably in the form of a bore, which extends through the supporting body 48. A connection to electronics, such as the evaluation unit of the safety mat for example, which are arranged within the supporting body 48 can be established through the passage opening 164. In a preferred exemplary embodiment, a cable, not illustrated here, is guided through the passage opening 164. The cable is preferably a multicore cable with a protective sheathing. As an alternative, it is also feasible to use a prefabricated cable harness.

The cable is preferably fixed in the passage opening 164 and the passage opening 164 is otherwise sealed in a dust- and water-tight manner by a seal or filling, so that a high International Protection Marking, for example in line with IP67, can be ensured. Owing to the fixing, that part of the cable which exits from the supporting body 48 out of the passage opening 164 has a defined, fixed length, and a plug connector is arranged at the end of the said cable. The plug connector is preferably a multipole round plug connector of type M5, M8 or M12. In a preferred exemplary embodiment, the plug connector has a screw-locking arrangement in line with DIN EN 61076-2-104 or a snap-locking arrangement. The plug connector can have an IP65/IP67 protection marking, for example by the plug connector being moulded on the cable. The plug connector is particularly preferably arranged in a metal housing which has 360° EMC-proof shielding in order to ensure a high degree of reliability for signal transmission.

The sockets 174a, 174b form receptacles for the plug connector. The shape of a socket 174a, 174b is matched to the shape of a plug connector. A socket 174a, 174b is preferably an elongate hollow with a semicircular cross section into which a round plug connector can be clipped, so that the plug connector is held in the hollow. The sockets 174a, 174b open on one side into a cavity 176a, 176b in the side faces 52a, 52b and merge on the opposite side with one of the cable guides 166, 168, 170, 172. In each case two sockets 174a, 174b are particularly preferably arranged in the manner of a cross in relation to one another in a corner region in which the first and the second side faces 52a, 52b meet. The distances by which the cavities 176a, 176b of the two sockets 174a, 174b are remote from the abutment edge 178 of the two side faces 52a, 52b are preferably the same, so that the cavities 176a, 176b of two adjacent safety mats are located opposite to one another when the safety mats abut flush one against the other. In a preferred exemplary embodiment with a cuboidal supporting body, intersecting sockets are arranged in all four corners with cavities in each case at a fixed distance from the side edges of the cuboidal supporting body. This way, the safety mats can be combined with one another in a particularly flexible manner and joined to form a multi component assembly.

The sockets 174a, 174b are connected to the passage opening 164 by means of cable guides 166, 168, 170, 172. In the exemplary embodiment according to FIG. 9, the passage opening 164 is arranged centrally with respect to an end side 180 of the safety mat. Here, two sockets 174a are arranged with a first orientation in which the cavities 176a of the sockets 174a lie in the side faces 52a, wherein two further sockets 174b are arranged with a second orientation, so that the cavities 176b of the said further sockets lie in the side faces 52b. The first and the second orientation are preferably at an angle of 90° in relation to one another when the supporting body 48 is rectangular. The transitions 182a, 182b from the sockets 174a, 174b to the cable guides 166, 168, 170, 174 are arranged at a first and a second distance from the passage opening 164, wherein the first distance and the second distance are different. An edge is formed at the transitions 182a, 182b, so that a plug connector which is inserted into the sockets 174a, 174b cannot slide into the cable guides.

A cable which emerges from the passage opening 164 can be inserted into the cable guides 166, 168, 170, 172. The cable guides 166, 168, 170, 172 form channels in the planar surface 162 which run from the passage opening 164 to the transitions 182a, 182b. The channel walls are rounded, wherein the rounded portion is designed such that a surface of the cable bears at least partially flush against the channel walls. The depth of the channels is designed such that a cable can be completely inserted into the channels and therefore does not protrude from the planar surface 162. The channels preferably have a barrel-like profile in cross section. In another exemplary embodiment, the profile is U-shaped, wherein the lower corners are rounded.

In one exemplary embodiment, the channels have a length which corresponds to the defined length of the cable which emerges from the passage opening 164. The channels of the individual cable guides 166, 168, 170, 172 are preferably of equal length. The profile of the cable guides 166, 168, 170, 172 is curved with large radii of curvature and does not have any corners. The profile is free of kinks. The radii are preferably greater than 10 cm. In the exemplary embodiment according to FIG. 9, the curved profile of a cable guide 166, 168, 170, 172 is made up of different sections. The sections can be straight or bent sections. Transition bends are preferably arranged between the sections, which are configured such that a curve in the transition from a straight section to an arcuate section becomes narrower only slowly and not suddenly. The curved profile makes it possible for even stiff cables which exhibit a low degree of flexibility to be uniformly inserted into the cable guides and therefore securely fitted. In particular, the risk of a core snapping or a plurality of cores being squashed such that a cross-connection is formed when the cables are kinked is reduced.

In one exemplary embodiment, the cable is laid in the cable guides 166, 168, 170, 172 without play. In another preferred exemplary embodiment, the channels have at least one first section 184 and one second section 186. A cable can be laid without play in the first section 184. In the second section 186 a compression space is formed by the cable guide widening in this region. The defined width of the cable guides in the first region of the second section 186 preferably uniformly increases and, in an adjoining second section, continuously decreases again down to the defined width of the first section 184. The compression space 186 is designed to lay a cable without play in order to compensate for slight variations in the cable length. The combination of sections with compression spaces 186 and sections 184 with accurately fitting cable guidance allows effective fixing of the cable in the channels, wherein a certain degree of flexibility in respect of the cable length is provided by the compression spaces 184 at the same time.

Flexibility during cable guidance is important when, in one exemplary embodiment, the sockets 174a, 174b have further structures for fixing the plug connectors in different positions. For example, it is conceivable for the plug connector to be able to be arranged within the socket 174a, 174b in a first and a second position, wherein the plug connector terminates flush with the side face 52 in the first position, and the plug connector extends beyond the side face 52 or comes to lie further in the interior of the supporting body 48 and therefore does not terminate flush with the side faces in the second position. The cable to the plug connector has to be longer or shorter in the second position than in the first position. This variation in length can be achieved by the compression spaces 186.

It goes without saying that the design of the rear side is not limited to the exemplary embodiments shown here. In particular, in other exemplary embodiments the passage opening 164 can also be arranged in an eccentric manner. Similarly, further passage openings can be provided with further cable guides and also passage openings can be provided with a plurality of cables in order to provide the further side faces with connection options. In a preferred exemplary embodiment, an output signal from the evaluation unit of the safety mat is supplied via a first passage opening 164 and an input or control signal is received via a further passage opening. Signals can particularly preferably be looped through from one passage opening, via the evaluation unit, to a further passage opening. An assembly of multiple safety mats, which are connected in series, can be formed particularly effectively in this way.

What is claimed is:

1. Pressure-sensitive safety device for monitoring a technical installation, comprising:
    a sensor which has at least one first sensor cell and one second sensor cell,
    a first, a second and a third electrode for contacting the first and the second sensor cell,
    a pressure-sensitive material within the first and the second sensor cell, which is configured, under local loading, to change an electrical property of the first and the second sensor cell at the site of loading, and
    an evaluation unit which is configured to provide an output signal depending on the actuation of the first and the second sensor cell,
    wherein the first electrode is connected to the first sensor cell, the second electrode is connected to the second sensor cell, and the third electrode is connected to both the first and the second sensor cell,
    wherein the pressure-sensitive safety device further comprises a first sequentialization element, a second sequentialization element and a terminal for supplying a defined first potential, and
    wherein the first, the second and the third electrode are connected to the evaluation unit by the first sequentialization element, and the first, the second and the third electrode are connected to the defined first potential by the second sequentialization element.

2. Pressure-sensitive safety device according to claim 1, further comprising a resistor which is arranged between the terminal of the first potential and the second sequentialization element.

3. Pressure-sensitive safety device according to claim 2, wherein the resistor is variable.

4. Pressure-sensitive safety device according to claim 2, further comprising a terminal for supplying a second potential,
   wherein the terminal of the second potential is connected to the first sequentialization element by a series resistor parallel to the evaluation unit.

5. Pressure-sensitive safety device according to claim 4, wherein the series resistor is variable.

6. Pressure-sensitive safety device according to claim 1, further comprising a first level and a second level,
   wherein the first and the second electrode are arranged in the first level and the third electrode is arranged in the second level, and
   wherein the first and the second level are spaced apart from one another by the pressure-sensitive material.

7. Pressure-sensitive safety device according to claim 6, further comprising a first orientation of the first and the second electrode, a second orientation of the third electrode and an intermediate region,
   wherein the intermediate region spaces apart and electrically insulates the first and the second electrode in the first level.

8. Pressure-sensitive safety device according to claim 7, further comprising a further conductive path and a through connection,
   wherein the further conductive path is arranged in the intermediate region and has the first orientation, and the through connection electrically connects the further conductive path to the third electrode.

9. Pressure-sensitive safety device according to claim 6, wherein the first level and the second level are formed from fabric comprising electrically conductive and electrically non-conductive yarn, and
   wherein the first, the second and the third electrode of conductive yarn are woven into the fabric.

10. Pressure-sensitive safety device according to claim 6, wherein the pressure-sensitive material is an electrically non-conductive flexible material which is designed in the form of a sieve and deforms under mechanical loading, so that the first and the second electrode of the first layer can partially contact the third electrode in the second layer in the region of the mechanical loading.

* * * * *